(12) United States Patent
Belogolovy et al.

(10) Patent No.: US 7,904,779 B2
(45) Date of Patent: Mar. 8, 2011

(54) FORWARD ERROR CORRECTION AND AUTOMATIC REPEAT REQUEST JOINT OPERATION FOR A DATA LINK LAYER

(75) Inventors: Andrey Vladimirovich Belogolovy, Saint Petersburg (RU); Evguenii Avramovich Krouk, Saint Petersburg (RU)

(73) Assignee: Intel Corporation, Santa Clara, CA (US)

( * ) Notice: Subject to any disclaimer, the term of this patent is extended or adjusted under 35 U.S.C. 154(b) by 887 days.

(21) Appl. No.: 11/576,296

(22) PCT Filed: Dec. 29, 2004

(86) PCT No.: PCT/RU2004/000535
§ 371 (c)(1),
(2), (4) Date: Mar. 29, 2007

(87) PCT Pub. No.: WO2006/073323
PCT Pub. Date: Jul. 13, 2006

(65) Prior Publication Data
US 2008/0022181 A1    Jan. 24, 2008

(51) Int. Cl.
*H04L 1/18* (2006.01)
*H03M 13/00* (2006.01)

(52) U.S. Cl. .................................................. 714/751
(58) Field of Classification Search ............... 714/751
See application file for complete search history.

(56) References Cited

U.S. PATENT DOCUMENTS

| 5,936,949 A | 8/1999 | Pasternak et al. |
| 6,615,382 B1 | 9/2003 | Kang et al. |
| 2002/0015419 A1 | 2/2002 | Kim et al. |
| 2002/0054578 A1 | 5/2002 | Zhang et al. |
| 2003/0031198 A1 | 2/2003 | Currivan et al. |

FOREIGN PATENT DOCUMENTS

WO    WO-2006073323 A1    7/2006

OTHER PUBLICATIONS

NN81102469: Error Detection With Imbedded Forward Error Correction, IBM Tech Disclosure, vol. 24; Issue # 5, pp. 2469-2472; Oct. 1, 1981.*
Kok, T. C., "An Adaptive Block Encoding Technique for Hybrid ARQ Schemes", *Sixth IEEE Symposium on Computers and Communications, Proceedings*, (Jul. 3-5, 2001),406-410.
"International Search Report for Application No. PCT/RU2004/00535, date mailed Oct. 14, 2005", 5 pgs.
"Written Opinion of the International Searching Authority for Application No. PCT/RU2004/00535, date mailed Oct. 14, 2005", 7 pgs.

* cited by examiner

*Primary Examiner* — Guy J Lamarre
(74) *Attorney, Agent, or Firm* — Schwegman, Lundberg & Woessner, P.A.

(57) ABSTRACT

A method and apparatus are provided for error correction of a communication signal. Joint operation of forward error correction (FEC) techniques and automatic repeat request (ARQ) techniques are conducted above a physical layer of a communication network. Forward error correction is applied if the number of errors is equal to or less than an error threshold. Automatic repeat request techniques are applied if errors remain in the data decoding using the forward error correction or if an error correcting module reports a failure in the data. In an embodiment, the error threshold is two errors or less. In an embodiment, information is encoded in a data link layer using a forward error correction module providing a code rate of 0.98 or greater.

49 Claims, 6 Drawing Sheets

FORWARD ERROR CORRECTION AND AUTOMATIC REPEAT REQUEST JOINT OPERATION FOR A DATA LINK LAYER

RELATED APPLICATIONS

This application is a U.S. National Stage Filing under 35 U.S.C. 371 from International Patent Application Serial No. PCT/RU2004/000535, filed Dec. 29, 2004, and published on Jul. 13, 2006 as WO 2006/073323 A1, which is incorporated herein by reference.

TECHNICAL FIELD

Embodiments of the invention relate generally to error correcting of communication signals.

BACKGROUND

A communication network typically includes equipment from various vendors sending data and information among the equipment in the network. To promote interoperability among vendor equipment, an open systems interconnection (OSI) reference model is a widely accepted structure to provide a standard architecture for such interoperability. Models similar to an OSI reference model may include a physical layer at the lowest structure layer followed by a data link layer. Above the data link layer, the model may include higher order layers such as a network layer, a transport layer, a session layer, a presentation layer, and an application layer. The layers may also include sub-layers.

The physical layer deals with the transmission of bit streams over a physical medium. It also deals with the mechanical, electrical, functional, and procedural characteristics to access the physical medium. The data link layer deals with the reliable transfer of information across the physical layer. It also sends blocks or frames for synchronization, error control, and flow control. The data link layer may include a medium access control (MAC) layer and a logical link control layer (LLC). Functions of the MAC layer, or sub-layer, may include assembling data into a frame with address and error-detection fields for transmission, dissembling frames and performing address identification and error detection on reception, and controlling access to the physical layer. The LLC layer may include functions such as interfacing to higher layers and performing flow and error control.

In addition to dealing with the interfacing of various vendor equipment, communication networks, for example computer networks, must deal with errors during data transmission in the communication channels of the network. A communication channel, whether it is a fiber optic channel, a co-axial channel, a wired channel, a wireless channel, or a bus connecting locations in a system over which large amounts of data are transferred, can add noise and error to information being transmitted over the channel. Various techniques may be used to deal with errors in data transmission. One approach is to use forward error correction (FEC) on a physical layer of the communication network. Another approach is to use automatic repeat requests (ARQ) on a data link layer of the communications network.

To correct for errors added by the communication channel, information can be sent in the form of codewords, where each codeword contains the same number of total bits and in which a number of the bits are information (message) bits and a number of bits are used for error correction. A codeword having a length of n bits includes k bits for the message length of the code and r=n−k redundant bits. The r bits are for error correction. To move to errorless data transmission, the error correcting capabilities of the code may be increased by using code redundancy. Alternatively, a large number of retransmission can be used. Either approach can add complexity to the communication process. However, there are cases of latency critical communications (real time audio and video), where the maximum data delay is limited, and the ARQ are either not allowed, or the maximum number of possible ARQ is strictly predefined. In high speed data communication what is needed is a reliable scheme that provides information with as few errors as possible, but at the same time can be implemented without a significant amount of complexity.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the present invention. Other embodiments may be utilized and structural, logical, and electrical changes may be made without departing from the scope of the invention. The various embodiments disclosed herein are not necessarily mutually exclusive, as some disclosed embodiments can be combined with one or more other disclosed embodiments to form new embodiments. The following detailed description is, therefore, not to be taken in a limiting sense, and the scope of the embodiments of the present invention is defined only by the appended claims, along with the full scope of equivalents to which such claims are entitled.

A current procedure to provide errorless data transmissions uses retransmissions of the data. These data retransmissions are conducted independently of forward error correction techniques. Accompanying retransmissions is a delay in providing data. This generated data delay due to a large average number of required retransmissions may play a significant role in the quality of data transmission in a communications network. Use of a concatenated codes application to provide zero error probability may be useful if error blocks are matched with blocks of concatenated codes. However, the resulting concatenated codeword may become significantly large, which is not suitable for small sized data link layer packets.

Proposals for the physical layer in 10-gigabit (10G) Ethernet include coded modulation on the physical layer. Experiments show that the errors, after the physical level coded modulation, have a special distribution. Despite the fact that the overall bit error rate after coded demodulation on the physical layer is about $10 \times 10^{-8}$, the errors are not uniformly distributed across the data frames. Using a more effective code on the physical layer leads to physical layer complication without any significant gain, because error correction will insert equal redundancy both in frames that have 1-2 errors and in frames that have 50 and more errors. In case of frames with 1-2 errors, the code redundancy may be superfluous. In case of frames with 50 and more errors, decoding may not correct all the errors and therefore may not provide an error probability equal to zero. A general solution for reliable communications uses FEC and ARQ separately, where retransmissions are used only to provide data integrity on layers above the physical level. To provide errorless data transmission, the error correcting capabilities of the code can be increased on the physical layer, providing code redundancy. Alternatively, a larger number of retransmissions on the data link layer may be used.

Coded modulation and error correction on the physical layer (PHY) for 10G Ethernet may include defined bit-error rate and error distribution after the physical layer error correction. Currently, a task force on 10G Ethernet for the IEEE 802.3™ standard has accepted use of coded modulation on the physical layer for 10G Ethernet PHY based on low-density parity check (LDPC) coded modulation schemes. LDPC codes provide a forward error correcting tool in high-speed communication systems due to the low decoding complexity and the bit-error rate (BER) achieved in an additive white Gaussian noise (AWGN) channel. Examples of known LDPC decoders include, among others, the min-sum algorithm, the a posteriori probability (APP) decoding algorithm, and the uniformly most powerful (UMP) decoder.

LDPC codes may use a parity check matrix containing mostly zeros and a limited number of ones. A binary $(n, \gamma, \rho)$ LDPC code has a codeword length, or block length, of n bits and a parity check matrix with exactly $\gamma$ ones in each column and exactly $\rho$ ones in each row. In the LDPC code, each code bit is checked by $\gamma$ parity checks and each parity check uses $\rho$ code bits. Further, the code has a rate defined as R=k/n, where k is the number of message (information) bits in the codeword having n bits.

The operation of a data link network layer may depend on properties of the physical layer. Properties for the 10 G Ethernet physical layer to consider include the fact that the physical layer is not completely errorless. Further, the physical layer LDPC based coded modulation schemes use frames that have a block structure, due to the block nature of LDPC codes. For example, an overall frame size may be about 2000-6000 bits. Standard decoding of LDPC codes (belief propagation or any other fast decoding algorithms) may include decoding that is iterative, symbol-by-symbol decoding. With symbol-by-symbol decoding, the decisions about bits inside the whole LDPC codeword are made independently during decoding. However, in spite of the fact that LDPC codes are block codes, the error decoding of the whole codeword may not contain many error bits. For example, if the codeword length is 2000, possible situations include 1 error bit per codeword, 2 error bits, 50-100 error bits etc. Due to properties of LDPC codes, when LDPC codes are used for coded modulation on the physical layer of the 10G Ethernet network, the error distribution in data blocks after decoding and demodulation is non-uniform. There are three most probable cases: whole blocks are errorless, blocks contain 1-2 errors per each block, and blocks contain 50 and more errors per every block. To provide errorless data transmissions, errors may be corrected via ARQ on the data link layer.

Standards such as the IEEE 802.3™ standard have used the MAC sublayer to resolve collisions occurring under concurrent media access. 10G Ethernet is designed to be used only in full duplex transmission, but not in half-duplex. In full duplex mode there are no collisions, so a function of the MAC sub-layer is to control data integrity via calculation and checking frame cyclic redundancy check (CRC) value, such as CRC32 value. If a frame checksum is not correct, the received frame is dropped and the MAC client reports that the error occurred, but no retransmission attempts are taken on the MAC level. Retransmission of a bad or dropped frame is initiated only two layers higher, on a transport layer such as TCP/IP, etc. Further, the Ethernet physical layer up to 1G is supposed to be errorless, but 10G Ethernet on its current stage does not meet such a requirement. Currently, traditional schemes on the data link layer do not consider the nature of the errors from the physical layer, and retransmissions are the only way to provide errorless transmission for the data link layer.

In an embodiment, signals received from a communication channel may be processed through joint operation above the physical layer of the communication network using forward error correction techniques and automatic repeat request techniques. Despite the fact that the overall bit error rate after coded demodulation on physical layer is about, for instance, $10 \times 10^{-8}$, the errors are not uniformly distributed across the data frames as discussed above. Since providing code redundancy for frames having 1-2 errors is superfluous, and since decoding may not correct all the errors in case of frames with 50 and more errors, an embodiment for joint operation of FEC techniques and ARQ above the physical layer may provide reliable data communication. In an embodiment, to avoid superfluous retransmissions, a high rate FEC (rate about 0.98-0.999) in the data link layer is used that allows correcting errors in physical layer frames that have only 1-2 errors. The use of a specific code rate may provide defining characteristics for the code words generated. A request for retransmission may be conducted only for data in physical layer frames that contain a large number of errors, because correction of errors in these frames with FEC is inadequate and leads to unacceptable redundancy. Embodiments may be implemented in future 10G Ethernet data link layers and other communication networks with similar properties.

In an embodiment, correcting errors on the physical layer frames may be conducted separately. For embodiments applied to 10G Ethernet, due to the nature of 10G Ethernet physical layer errors, the FEC with very low redundancy above the physical layer is used to avoid retransmissions, but the retransmissions also are allowed, to provide overall errorless transmission. In contrast to concatenated codes, a joint FEC and ARQ approach is used to find a balance between redundancy and retransmissions. The usage of joint FEC and ARQ may lead to decreasing the number of retransmissions.

Figure 1:
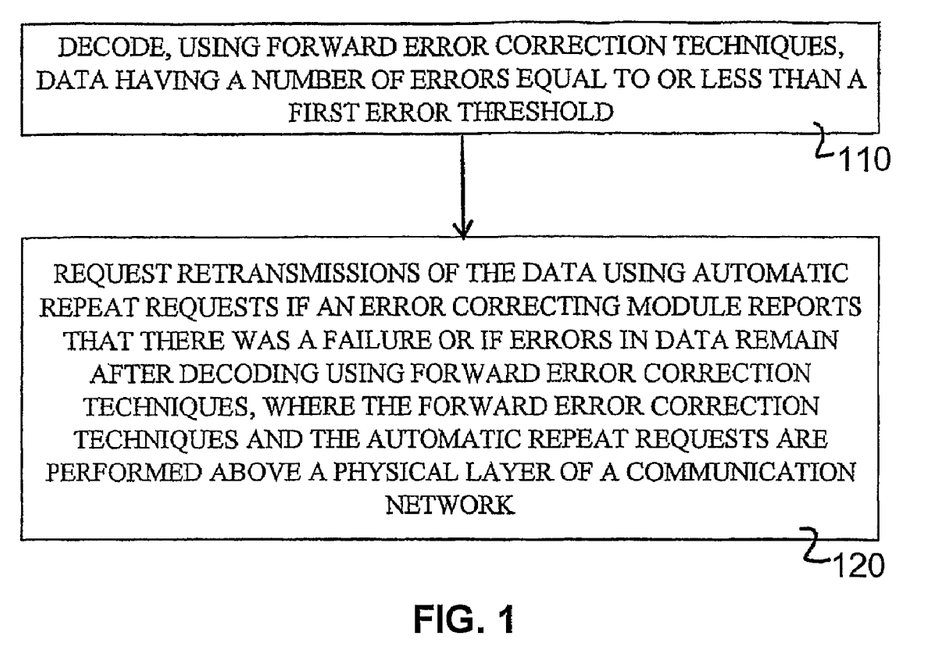
FIG. 1 shows a flow diagram of an embodiment of a method including forward error correction and automatic repeat requests performed above a physical layer of a communication network.

FIG. 1 shows a flow diagram of an embodiment of a method including forward error correction and automatic repeat requests performed above a physical layer of a communication network. At 110, data is decoded using forward error correction techniques above the physical layer of a communication network if the number of errors in the data is equal to or less than an error threshold. In an embodiment, the error threshold is set at two errors or less. In an embodiment, the error threshold is the number of errors corrected using the forward error correction techniques above the physical layer for a given application. If the number of errors in the received data is less than or equal to the threshold and the errors are corrected, a message or indicator may be provided indicating that the decoding was a success. At 120, if an error correcting module reports that there was a failure or if errors in data remain after decoding using forward error correction techniques, a request to retransmit the data using automatic repeat requests above the physical layer is performed.

In an embodiment, the FEC techniques may be performed in a data link layer. The ARQ techniques may be performed in a data link layer. In an embodiment, the FEC techniques and the ARQ techniques are both performed in the data link layer. In an embodiment, the FEC techniques may be performed in a medium access control layer. The ARQ techniques may be performed in a medium access control layer. In an embodiment, the FEC techniques and the ARQ techniques are both performed in the medium access control layer. The data decoded may be provided through a communication channel after the information in the data has been encoded in a data link layer using a forward error correction encoder with code rate of 0.98 or higher. In an embodiment, such a code rate may be about 0.99. In an embodiment, a code rate may be used that operates at a rate such that the number of retransmissions needed is two or less. In an embodiment, the data is received from a wireless communication channel.

Figure 2:
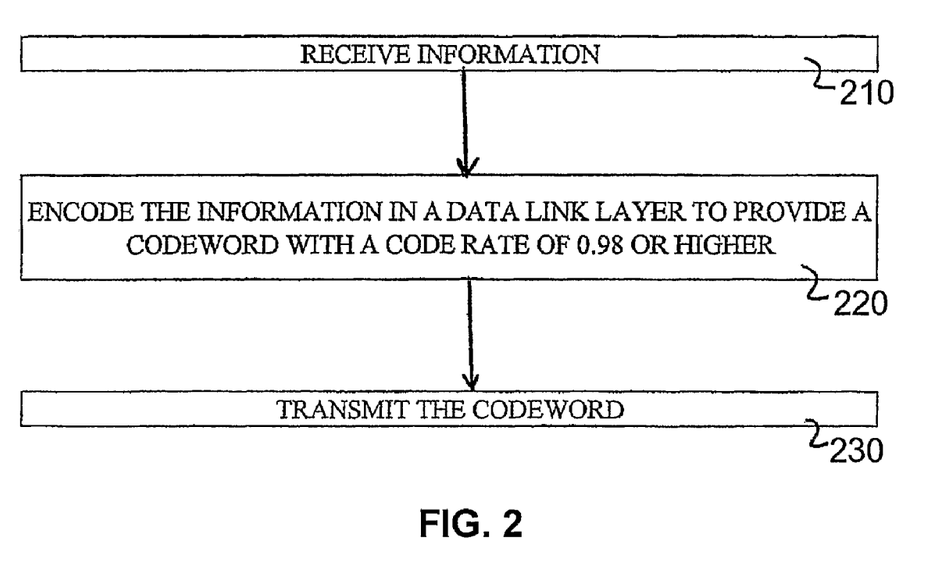
FIG. 2 shows a flow diagram of an embodiment of a method including encoding information in a data link layer with a high code rate.

FIG. 2 shows a flow diagram of an embodiment of a method including encoding information in a data link layer with a high code rate. At 210, information is received. At 220, the information is encoded in a data link layer to provide a codeword with a code rate of 0.98 or higher. At 230, the codeword is transmitted. Encoding the information in a data link layer may be adapted to provide a codeword such that decoding the codeword includes decoding data representing the codeword using FEC techniques above a physical link layer, if the data has a number of errors equal to or less than an error threshold. If, after decoding using FEC techniques above a physical link layer, errors remain in the data, a retransmission request is generated above the physical layer using ARQ techniques. If, after decoding using FEC techniques above a physical link layer, an error correcting module reports a failure regarding the data, a retransmission request is generated above the physical layer using ARQ techniques. In an embodiment, the codeword is provided with a code rate of about 0.99. In an embodiment, the codeword is provided with a code rate such that the number of retransmissions needed is two or less. In an embodiment, the codeword may be transmitted in a wirelessly communication channel.

Figure 3:
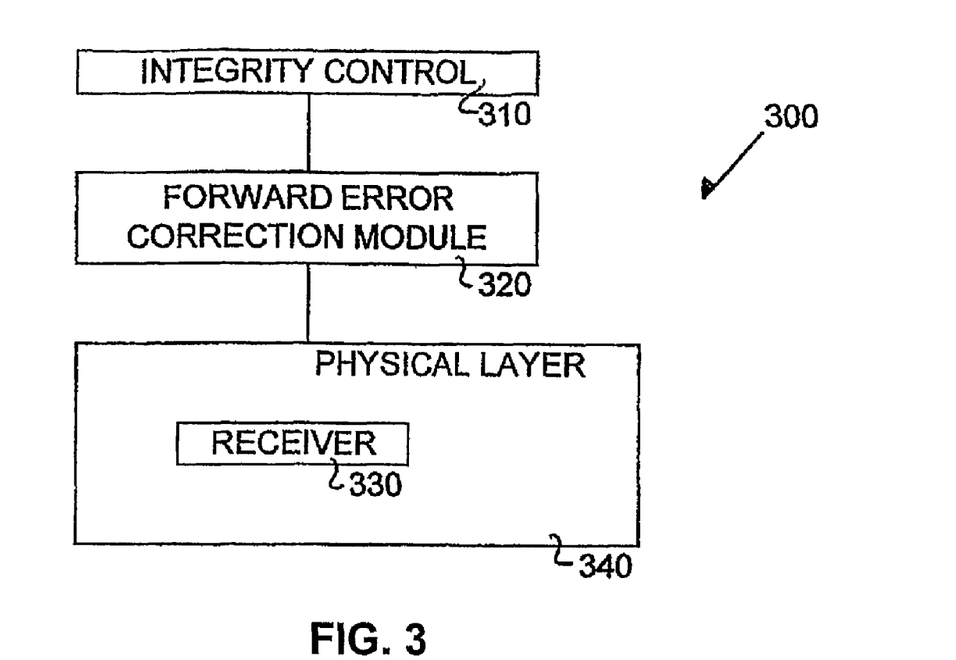
FIG. 3 illustrates a block diagram of an embodiment of an apparatus to conduct forward error correction and automatic repeat requests above a physical layer.

FIG. 3 illustrates an embodiment of an apparatus 300 to conduct forward error correction and automatic repeat requests above a physical layer. Apparatus 300 may include an integrity control 310, a forward error correction module 320, and a receiver 330 configured in a physical layer 340 to communicate in a network. Integrity control 310 and FEC module 320 are configured above physical layer 340. FEC module 320 may be configured to decode information from data acquired by receiver 330, if the data has a number of errors equal to or less than an error threshold. If FEC module 320 corrects the errors, FEC module may be in a "success" state and may provide an indication of such a state. In an embodiment, the error threshold is two errors or less. In an embodiment, the error threshold is the number of errors corrected using FEC module 320 above the physical layer for a given application. If errors remain in the code after decoding using FEC module 320 or if FEC module 320 reports a failure regarding the data, integrity control 310 uses ARQ techniques to request retransmissions of the data. The error threshold is not limited to two errors or less but may be set to appropriate values for the application in which the embodiment is adapted.

In an embodiment, FEC module 320 may be adapted to operate in a data link layer. Integrity control 310 configured to apply ARQ techniques may be adapted to operate in a data link layer. In an embodiment, FEC module 320 and integrity control 310 configured to apply ARQ techniques may both be adapted to operate in a data link layer. In an embodiment, FEC module 320 may be adapted to operate in a medium access control layer. Integrity control 310 configured to apply ARQ techniques may be adapted to operate in a medium access control layer. In an embodiment, FEC module 320 and integrity control 310 configured to apply ARQ techniques may both be adapted to operate in a medium access control layer. In an embodiment, FEC module 320 may operate to decode data having information encoded in a data link layer using a forward error correction encoder with code rate of 0.98 or higher. In an embodiment, apparatus 300 may be configured as a wireless device.

Figure 4:
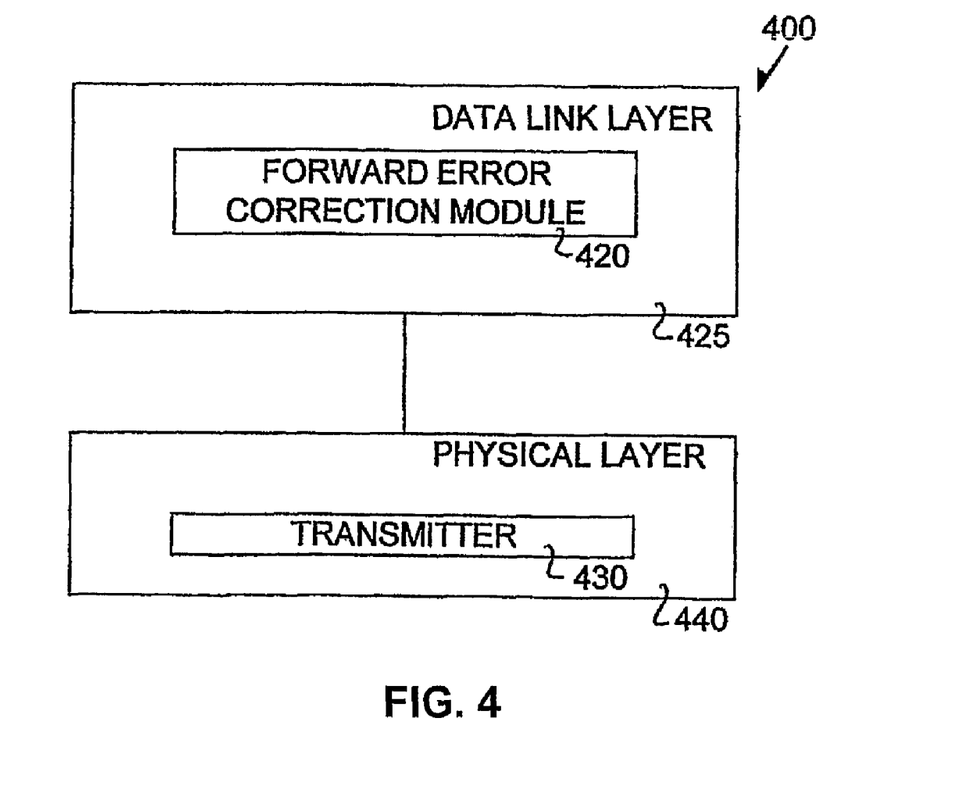
FIG. 4 illustrates a block diagram of an embodiment of an apparatus to encode information in a data link layer with a high code rate.

FIG. 4 illustrates an embodiment of an apparatus 400 to encode information in a data link layer with a high code rate. Apparatus 400 may include a forward error correction module 420 configured in a data link layer 425 and a transmitter 430 configured in a physical layer 440 to communicate in a network. FEC module 420 is adapted to encode information to provide a codeword with a code rate of 0.98 or higher. In an embodiment, the code rate is about 0.99. Transmitter 430 sends the encoded codeword onto a communication channel.

In an embodiment, forward error correction module 420 is configured to provide the codeword such that the codeword is adapted to undergo forward error correction techniques above a physical layer to decode data representing the codeword if the data has a number of errors equal to or less than an error threshold. In an embodiment, the error threshold is two errors. If, after decoding using FEC techniques above a physical link layer, errors remain in the data, a retransmission request is generated above the physical layer using ARQ techniques. If, after decoding using FEC techniques above a physical link layer, an error correcting module reports a failure regarding the data, a retransmission request is generated above the physical layer using ARQ techniques. In an embodiment, the codeword is provided with a code rate of about 0.99. In an embodiment, the codeword is provided with a code rate such that the number of retransmissions needed is two or less. In an embodiment, apparatus 400 is configured as a stationary wireless device.

Figure 5:
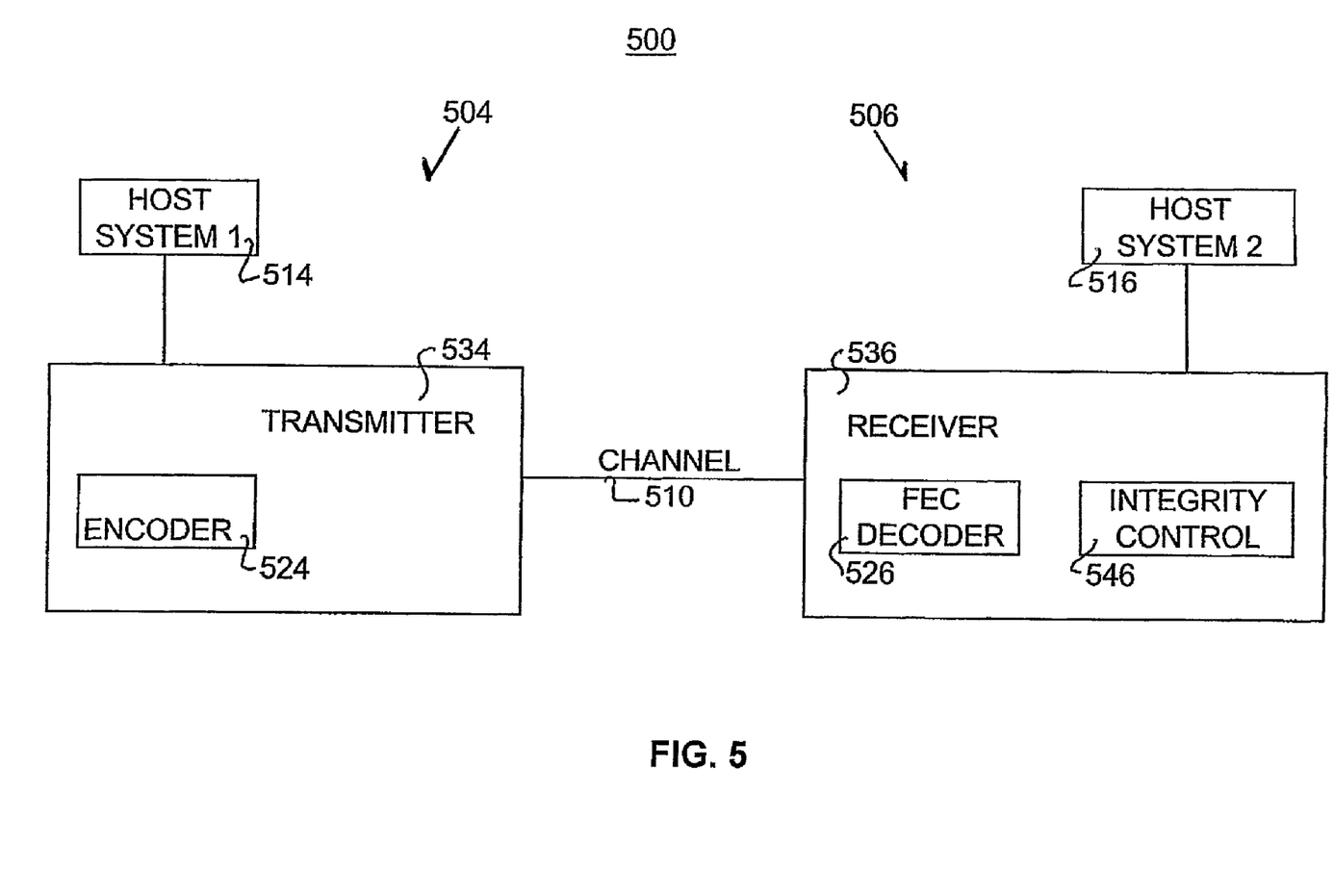
FIG. 5 illustrates an embodiment of a structure of a communication system in which a FEC encoder and a FEC decoder operate above a physical layer.

FIG. 5 illustrates an embodiment of a structure of a communication system 500 in which a FEC encoder 524 and a FEC decoder 526 operate above a physical layer. Communication system 500 may include network node 504 having FEC encoder 524 and network node 506 having FEC decoder 526. Network node 504 may include a host system 514 communicatively coupled to a transmitter 534. Host system 514 may be communicatively coupled to transmitter 534 over a bus that is compatible with Peripheral Component Interconnect (PCI) or with PCI express. Transmitter 534 transmits codewords encoded from information provided to encoder 524. FEC encoder 524 may be configured as part of transmitter 534 or external to transmitter 534 and may receive the information from host system 514. In an embodiment, FEC encoder 524 operates above a physical layer in a manner similar to one or more embodiments described herein.

Network node 506 may include a host system 516 communicatively coupled to a receiver 536. Host system 516 may be communicatively coupled to receiver 536 over a bus that is compatible with PCI or with PCI express. Receiver 536 receives signals carrying data from channel 510. The data is decoded into appropriate codewords using FEC decoder 526 to provide information to host system 516. If the data contains more than a predetermined number of errors for correction by FEC decoder 526, an integrity control 546 requests retransmission using ARQ techniques. In an embodiment, FEC decoder 526 and integrity control 546 operate above a physical layer in a manner similar to one or more embodiments described herein. FEC decoder 526 and integrity control 546 may be configured as part of receiver 536 or external to receiver 536 and may provide the information upon decoding to host system 516.

The network nodes 504, 506 each may represent processing systems having a physical layer (PHY) entity arranged to operate in accordance with 10GBase-T as defined by the IEEE 802.3an series of standards, for example. The 10GBase-T PHY may interface with, for example, a 10G media access control (MAC) and Gigabit Media Independent Interface (XGMII) in the IEEE architecture. The 10GBase-T PHY may include part of a network interface card (NIC), for example. Nodes 504, 506 may include any processing system and/or communications device suitable for use with a 10GBase-T device. For example, nodes 504, 506 may be implemented as a pair of switches, a pair of routers, a pair of servers, a switch and a router, a switch and a server, a server and a router, and so forth. In addition, nodes 504, 506 also may be part of a modular system in which 10GBase-T is the high-speed connection for the system. In an embodiment, network nodes 504, 506 may be arranged such that host system 514 and host system 516 are configured as a single host system. Further examples for nodes 504, 506 may include high-end servers, supercomputers, clusters, grid computing, workgroup switch uplinks, aggregation uplinks, storage systems, and so forth. The embodiments are not limited in this context.

Figure 6:
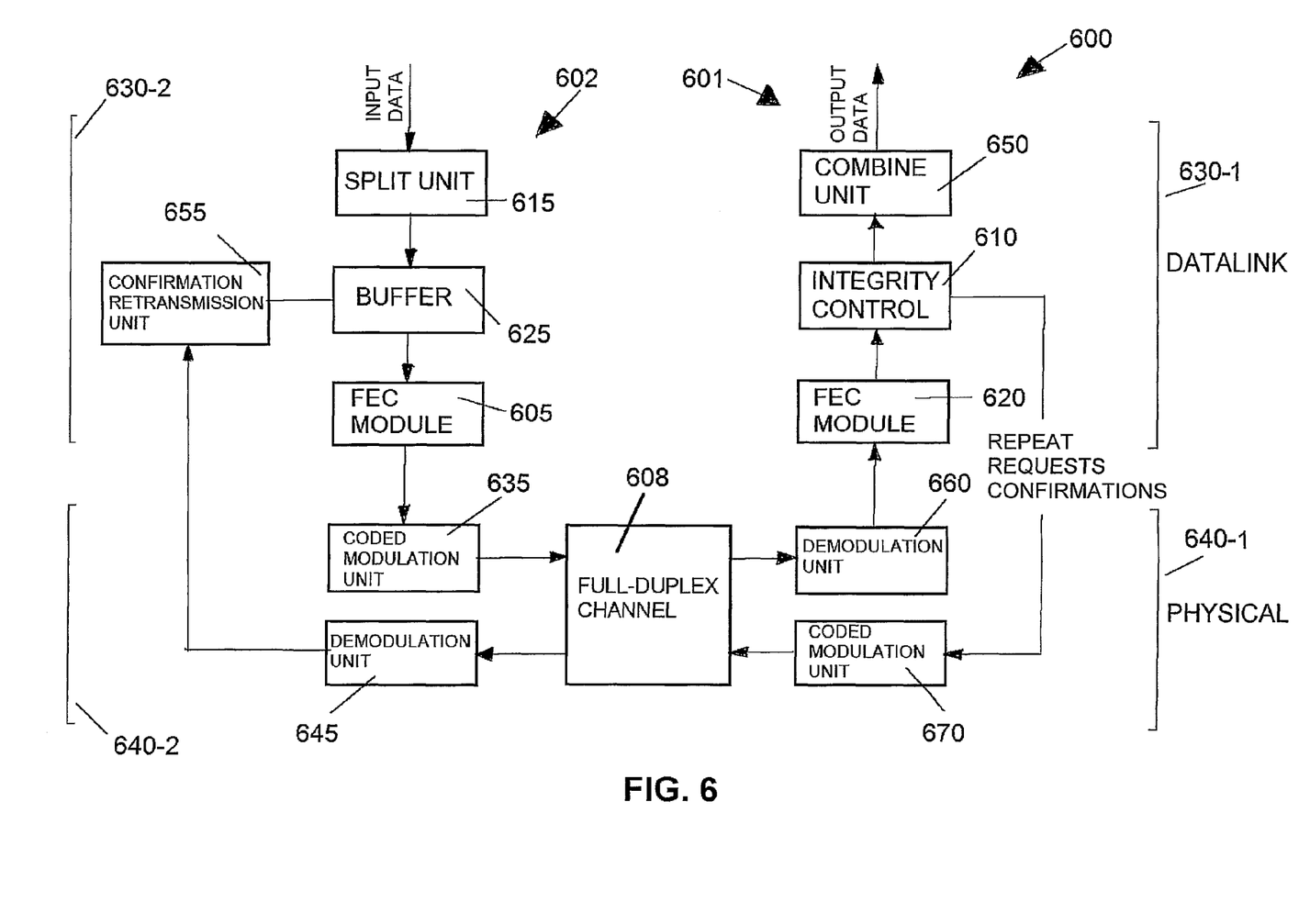
FIG. 6 illustrates a block diagram of an embodiment of a communication network having a system with a forward error correction module with a high code rate in a data link layer to encode information and a system having a forward error correction modulation in a data link layer to decode data and a integrity control in the data link layer to generate automatic repeat requests.

FIG. 6 illustrates a block diagram of an embodiment of a communication network 600 having a system 601 and a system 602 communicating through communication channel 608. System 602 includes a forward error correction module 605 with a high code rate in a data link layer 630-2 to encode information. System 601 includes a forward error correction module 620 in a data link layer 630-1 to decode data and an integrity control 610 in the data link layer 630-1 to generate automatic repeat requests. Data link layer 630-1 is the data link layer of communication network 600 relative to system 601, while data link layer 630-2 is the data link layer of communication network 600 relative to system 602. Similarly, physical layer 640-1 is the physical layer of communication network 600 relative to system 601, while physical layer 640-2 is the physical layer of communication network 600 relative to system 602.

Communication channel 608 couples system 601 and system 602 to provide a medium for propagating information between system 601 and 602. In an embodiment, communication channel 608 may be a full-duplex channel. Communication channel 608 may include, but is not limited to, a fiber optic channel, a wired channel, a channel for reading data stored on a memory unit, or a wireless channel. Additionally, embodiments for decoding and encoding may be adapted for use with any protocol for transmission over any communication channel.

System 602, in addition to FEC encoder module 605, may include a split unit 615 to split packets, a buffer 625, a confirmations and retransmissions unit 655, a demodulation unit 645, and a coded modulation unit 635 from which data is transmitted onto communication channel 608. FEC encoder module 605 may be adapted to encode information with a code rate of 0.98 or better. In an embodiment, FEC encoder module 605 has a code rate of about 0.99. Codewords generated by FEC encoder module 605 may be provided to coded modulation unit 635. At coded modulation unit 635, forward error correction techniques may be applied on physical layer 640-2.

System 601, in addition to integrity control 610 and FEC module 620, may include a combine unit 615 to combine data from packets, a coded modulation unit 670 to send confirmations and repeat requests to systems with which system 601 is communicating, and a demodulation unit 660 to receive signals from communication channel 608. At coded modulation unit 670, forward error correction techniques may be applied on physical layer 640-1 to repeat requests and confirmations sent to communication channel 608.

FEC module 620 may be adapted to decode codewords having a number of errors less than an error threshold. In an embodiment, the error threshold is set to two errors. In an embodiment, the error threshold is set to one error. The error threshold is not limited to two errors or less but may be set to appropriate values for the application in which the embodiment is adapted. Integrity control 610 may be adapted to implement ARQ techniques for errors that remain after decoding using FEC module 605 or if FEC module 605 reports an error regarding the data. In an embodiment, the error threshold may be stored in software as a set of values that may be applied at different times in operation.

Various embodiments for communication network 600, system 601, and system 602 may be realized. Communication network 600 may be a land based network using optical fibers, coaxial cable, or wires as a medium for the communication channels between various nodes of communication network 600. Each node of communication network 600 configured as a land based network or as a wireless based network may contain a version of system 602 and/or a version of system 601 or a system that is a combination of system 602 and system 601. Communication network 600 may be realized as a wireless network in which systems 602 and 601 are configured as part of a node of communication network 600 or as part of a wireless receiving device that receives signals from the nodes of communication network 600. System 601 and system 602 may be configured as part of, but not limited to, network components such as a stationary wireless devices and base stations and may be configured as part of, but not limited to, wireless receiving devices such as portable wireless devices, handheld communication devices, computers, and laptop computing devices. Though not shown, systems 601 and 602 configured in a wireless communication system 600 may include antennas for transmitting and receiving signals. The error handling schemes and apparatus do not limit the type or configuration of supporting components such as antennas in systems 601, 602. In an embodiment, a substantially omnidirectional antenna may be utilized.

Figure 7:
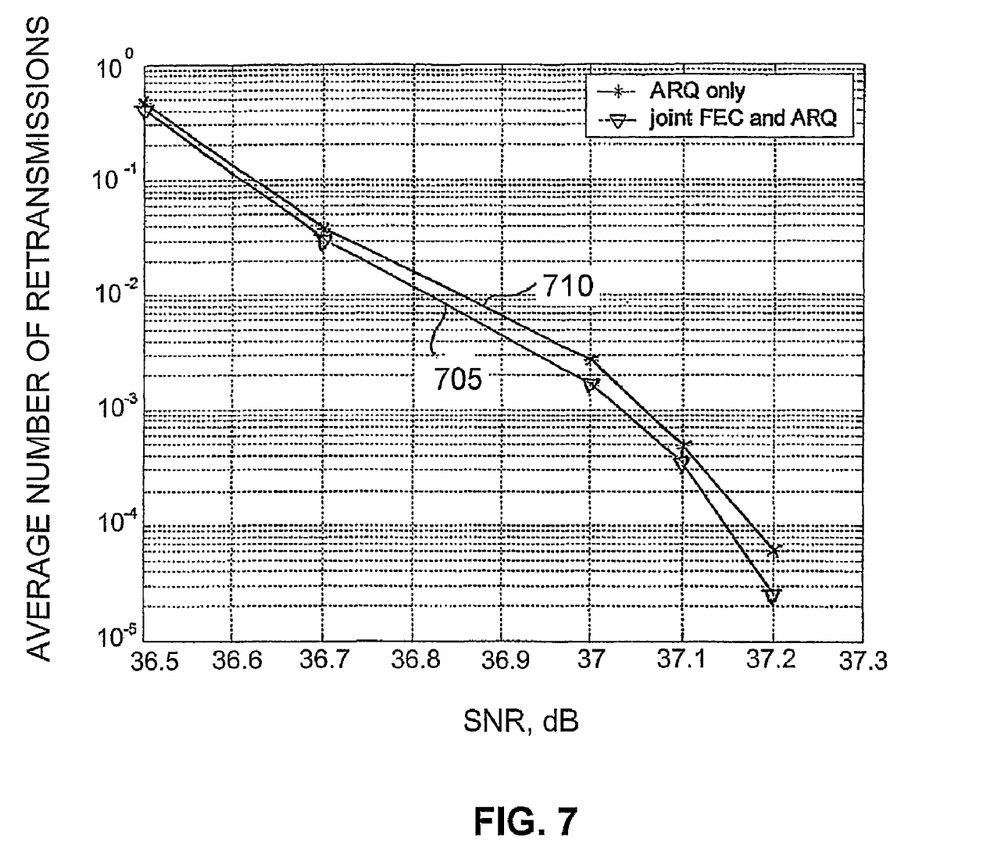
FIG. 7 demonstrates an example of performance of an embodiment using a joint operation of forward error correction and automatic repeat request with respect to automatic repeat request only operation.

FIG. 7 demonstrates an embodiment of a joint operation of forward error correction and automatic repeat request with respect to automatic repeat request only with respect to operation in the data link layer. Joint FEC and ARQ operation is shown by curve 705, while ARQ only operation is shown by curve 710. At a signal-to-noise ratio (SNR) of 37 dB, the average number of retransmissions of ARQ only is about $2.75 \times 10^{-3}$, while the average number of retransmissions of joint FEC and ARQ operation is about $1.8 \times 10^{-3}$. With transmission of a file having a file length of 1 Mb, the gain from joint FEC and ARQ on the data link layer is about 2 μs.

Various embodiments or combination of embodiments for apparatus and methods for joint operation of forward error correction techniques and automatic repeat request techniques above a data link layer to decode signals, as described herein, can be realized in hardware implementations, software implementations, and combinations of hardware and software implementations. Various embodiments for apparatus and methods for encoding information on a data link layer using forward error correction with a code rate of 0.98 or higher, as described herein, can be realized in hardware implementations, software implementations, and combinations of hardware and software implementations. Various embodiments include both joint operation of forward error correction techniques and automatic repeat request techniques above a data link layer for decoding and FEC encoding with a code rate of 0.98 or higher. These implementations may include a computer-readable medium having computer-executable instructions for performing an embodiment of a joint operation of forward error correction techniques and automatic repeat request techniques above a data link layer and/or using an embodiment for encoding information on a data link layer using forward error correction with a code rate of 0.98 or higher. The computer-readable medium is not limited to any one type of medium. The computer-readable medium used will depend on the application using an embodiment of the joint FEC/ARQ operation and/or FEC encoding of information at a code rate of 0.98 or higher in a data link layer. In an embodiment, a processor coupled to a receiver and/or transmitter may utilize various forms of memory to which it is coupled and the computer-readable medium to direct joint FEC/ARQ decoding operation and/or FEC encoding of information at a code rate of 0.98 or higher in a data link layer for data transmission in a channel from a physical layer. In an embodiment, the memory may store parameters used in the various embodiments as discussed herein.

Figure 8:
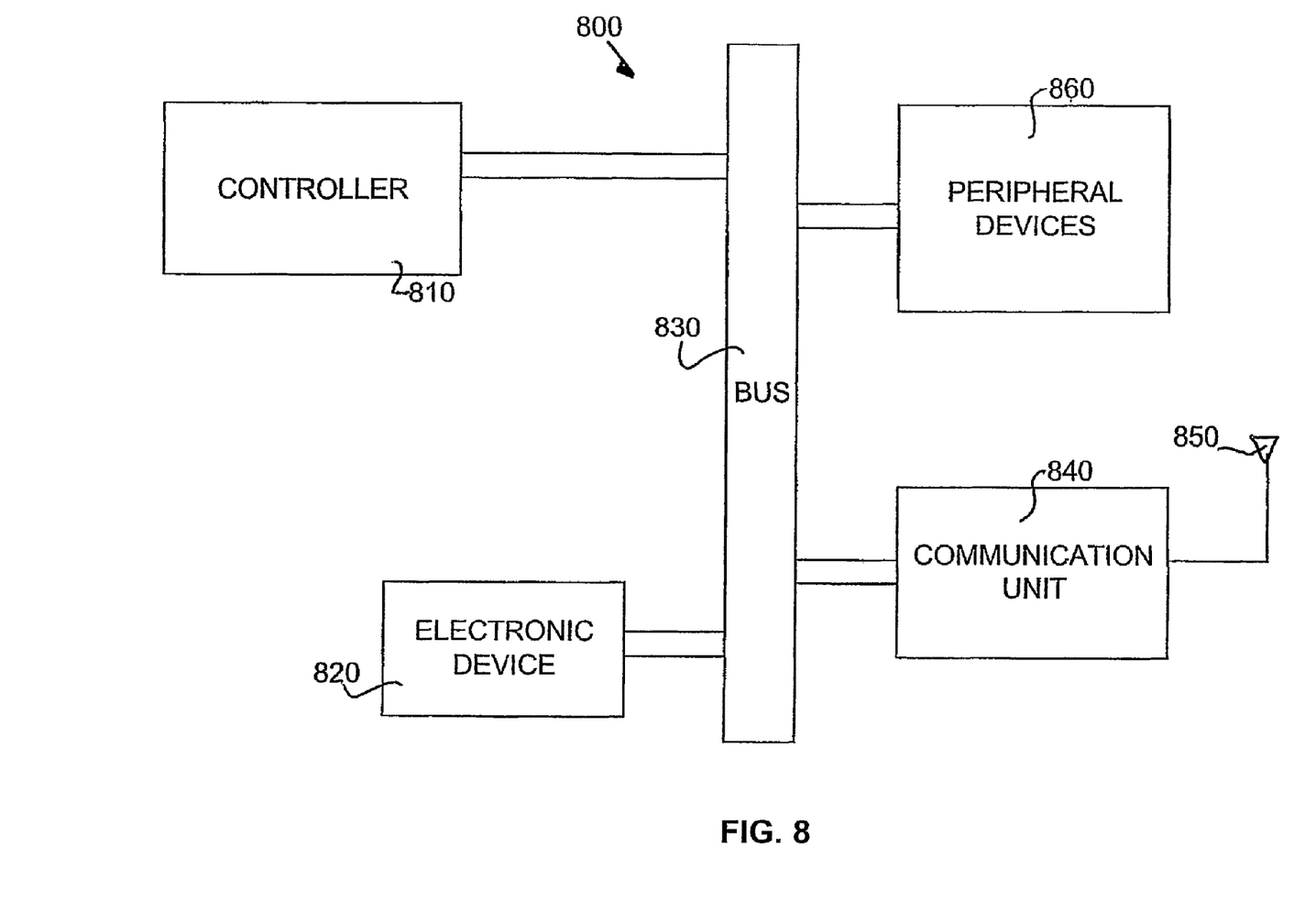
FIG. 8 illustrates a block diagram of an embodiment of a system having a forward error correction module to decode data and an integrity control to generate automatic repeat requests, where the decoding forward error correction module and the integrity control to generate automatic repeat requests are configured above the physical layer according to various embodiments.

FIG. 8 illustrates a block diagram of an embodiment of a system 800 having a forward error correction module to decode data and an integrity control to generate automatic repeat requests, where the decoding forward error correction module and the integrity control to generate automatic repeat requests are configured above the physical layer according to various embodiments. System 800 may include a high code rate forward error correction module in a data link layer to encode information. Such an encoder may be realized as a FEC encoder with a code rate of about 0.98 or higher. System 800 includes a controller 810, an electronic device 820, and a bus 830, where bus 830 provides electrical conductivity between controller 810 and electronic device 820, and between controller 810 and communication unit 840. An embodiment may include an additional peripheral device or devices 860 coupled to bus 830. Bus 830 may be compatible with PCI or with PCI express. In an embodiment, communication unit 840 may include a network interface card. In an embodiment, communication unit 840 may a communications device suitable for use with a 10 GBase-T device. In a wireless embodiment, communication unit 840 is coupled to an antenna 850. In an embodiment, antenna 850 may be a substantially omnidirectional antenna. Electronic system 800 may include, but is not limited to, information handling devices, wireless systems, telecommunication systems, fiber optic systems, electro-optic systems, and computers.

In an embodiment, controller 810 is a processor. In an embodiment, electronic device 820 is a memory that stores computer executable instructions to perform FEC techniques and ARQ techniques above a physical layer of a communication network to which system 800 is coupled with respect to data received by system 800. Peripheral devices 860 may include displays, additional storage memory, or other control devices that may operate in conjunction with controller 810. Alternatively, peripheral devices 860 may include displays, additional storage memory, or other control devices that may operate in conjunction with controller 810, communication unit 840, and/or electronic device 820.

Embodiments for a joint FEC and ARQ scheme operating above a physical layer may be adapted to be used in any system operating with a communication channel. The communication channel may be part of a land based communication network or a wireless communication network. Indeed, embodiments may well be implemented as part of any wireless system using multi-carrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and similar communication systems.

Various embodiments of joint FEC and ARQ operation above the physical layer provide method and apparatus that decrease message delay due to minimization in the number of retransmission. The various embodiments of joint FEC and ARQ also provide overall error probability approximately equal to zero due to matched retransmission. These various embodiments allow the physical layer error correction to be kept "as is" without more complications, since such configurations reduce or eliminate the need for the physical layer on networks such as 10G Ethernet to be errorless. Further, lowering the number of automatic repeat requests allows an increase in overall data transfer rate in spite of using additional forward error correction. Using a FEC encoder with a code rate about 0.98 or higher, needed error correction may be performed on the MAC layer that avoids retransmission of long packets.

Increasing the quality of transmission by using the error-correcting codes at levels above the physical layer tends toward the optimization of the coding system, i.e., codes parameters, multilevel coded modulation properties, etc. Coded modulation scheme on the physical level may be selected in order to provide non-uniform distribution of errors, as it is done in PAM using LDPC coded modulation. However, the distance between groups of errors may be made larger. For example, for joint FEC and ARQ operation, the result of LDPC coded modulation may include frames in which 2-3 errors may be the most probable and other frames may either contain no errors at all or contain a very large number of errors (100-150 and more). Larger distances between groups of errors may lead to better results of joint FEC and ARQ operation. The trade-off between FEC and ARQ can be used to operate on low SNRs. If the delay time is not critical, a significant gain in power consumption is possible by increasing the delay and properly selecting codes on the physical layer and above. Also, other coded modulation schemes on the physical layer may be used to provide non-zero error probability on the physical layer and large distances between groups of errors. The applications of joint FEC and ARQ operation may be used not only on 10G Ethernet networks, but also wireless communications in one-to-one transmission modes and also in one-to-many transmission mode (broadcast, multicast).

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon reviewing the above description. The scope of the present invention includes any other applications in which embodiment of the above structures and fabrication methods are used. The scope of the embodiments of the present invention should be determined with reference to the appended claims, along with the full scope of equivalents to which such claims are entitled.

What is claimed is:

1. A method comprising:
    decoding, using forward error correction techniques, data having a number of errors per frame equal to or less than an error threshold such that the data is not decoded, using forward error correction techniques, when the number of errors is greater than the error threshold; and
    requesting retransmissions of the data using automatic repeat requests only if the number of errors is equal to or greater than a retransmission threshold, the retransmission threshold being at least 10 times greater than the error threshold, wherein the forward error correction techniques and the automatic repeat requests are performed above a physical layer of a communication network.

2. The method of claim 1, wherein the error threshold is two errors or less and the transmission threshold is 50 errors or greater.

3. The method of claim 1, wherein the method includes requesting retransmissions of the data using automatic repeat requests above a physical layer of a communication network if an error correcting module reports a failure.

4. The method of claim 1, wherein using forward error correction techniques includes performing the forward error correction techniques in a data link layer.

5. The method of claim 1, wherein using forward error correction techniques includes performing the forward error correction techniques in a medium access control layer.

6. The method of claim 1, wherein decoding includes decoding data encoded in a data link layer using a forward error correction encoder with code rate of 0.98 or higher.

7. The method of claim 1, wherein decoding includes decoding data encoded in a data link layer using a forward error correction encoder with code rate such that requesting retransmissions of the data is performed two or less number of times.

8. A method comprising:
    receiving information;
    encoding the information in a data link layer using a forward error correction encoder to provide a codeword with a code rate of 0.98 or higher;
    transmitting the codeword;
    receiving data representing another codeword;
    decoding the data using forward error correction techniques if the data has a number of errors per frame equal to or less than an error threshold such that the data is not decoded, using forward error correction techniques, when the number of errors is greater than the error threshold; and
    requesting retransmissions of the data using automatic repeat requests only if the number of errors is equal to or greater than a retransmission threshold, the retransmission threshold being at least 10 times greater than the error threshold, wherein the forward error correction techniques and the automatic repeat requests are performed above a physical layer of a communication network.

9. The method of claim 8, wherein the transmission threshold is 50 errors or greater.

10. The method of claim 8, wherein the error threshold is two errors or less.

11. The method of claim 9, wherein encoding the information includes encoding the information in the data link layer provide a codeword with a code rate of about 0.99.

12. The method of claim 8, wherein transmitting the codeword includes wirelessly transmitting the codeword.

13. A computer-readable medium having computer-executable instructions for performing a method comprising:
    decoding, using forward error correction techniques, data having a number of errors per frame equal to or less than an error threshold such that the data is not decoded, using forward error correction techniques, when the number of errors is greater than the error threshold; and
    requesting retransmissions of the data using automatic repeat requests only if the number of errors is equal to or greater than a retransmission threshold, the retransmission threshold being at least 10 times greater than the error threshold, wherein the forward error correction techniques and the automatic repeat requests are performed above a physical layer of a communication network.

14. The computer-readable medium of claim 13, wherein the error threshold is two errors or less.

15. The computer-readable medium of claim 13, wherein using forward error correction techniques includes performing the forward error correction techniques in a data link layer.

16. The computer-readable medium of claim 13, wherein the computer-readable medium is a component of a wireless system.

17. A computer-readable medium having computer-executable instructions for performing a method comprising:
    receiving information;
    encoding the information in a data link layer using a forward error correction encoder to provide a codeword with a code rate of 0.98 or higher;
    transmitting the codeword;
    receiving data representing another codeword;
    decoding the data using forward error correction techniques if the data has a number of errors per frame equal to or less than an error threshold such that the data is not decoded, using forward error correction techniques, when the number of errors is greater than the error threshold; and requesting retransmissions of the data using automatic repeat requests only if the number of errors is equal to or greater than a retransmission threshold, the retransmission threshold being at least 10 times greater than the error threshold, wherein the forward error correction techniques and the automatic repeat requests are performed above a physical layer of a communication network.

18. The computer-readable medium of claim 17, wherein the transmission threshold is 50 errors or greater.

19. The computer-readable medium of claim 17, wherein the error threshold is two errors or less.

20. The computer-readable medium of claim 17, wherein encoding the information includes encoding the information in the data link layer provide a codeword with a code rate of about 0.99.

21. The computer-readable medium of claim 17, wherein the computer-readable medium includes computer-executable instructions to transmit the codeword includes wirelessly transmitting the codeword.

22. An apparatus comprising:
a forward error correction module to decode information from acquired data if the data has a number of errors per frame equal to or less than an error threshold such that the data is not decoded, using forward error correction techniques, when the number of errors is greater than the error threshold; and
an integrity control to request retransmissions of the data using automatic repeat requests only if the number of errors is equal to or greater than a retransmission threshold, the retransmission threshold being at least 10 times greater than the error threshold, wherein the forward error correction module and the integrity control are adapted to operate above a physical layer of a communication network.

23. The apparatus of claim 22, wherein the error threshold is two errors or less.

24. The apparatus of claim 22, wherein the integrity control is adapted to request retransmissions of the data using automatic repeat requests if error correcting module reports a failure.

25. The apparatus of claim 22, wherein the forward error correction module is adapted to operate in a data link layer of the communication network.

26. The apparatus of claim 22, wherein the forward error correction module is adapted to operate in a medium access control layer of the communication network.

27. The apparatus of claim 22, wherein the forward error correction module is adapted to operate to decode data that has been encoded in a data link layer using a forward error correction encoder with code rate of 0.98 or higher.

28. The apparatus of claim 22, wherein the apparatus is a wireless device.

29. An apparatus comprising:
a forward error correction module in a data link layer to encode information providing a codeword with a code rate of 0.98 or higher;
a transmitter to transmit the codeword;
a forward error correction module to decode information from acquired data if the data has a number of errors per frame equal to or less than an error threshold such that the data is not decoded, using forward error correction techniques, when the number of errors is greater than the error threshold; and
an integrity control to request retransmissions of the data using automatic repeat requests only if the number of errors is equal to or greater than a retransmission threshold, the retransmission threshold being at least 10 times greater than the error threshold, wherein the forward error correction module and the integrity control are adapted to operate above a physical layer of a communication network.

30. The apparatus of claim 29, wherein
the transmission threshold is 50 errors or greater.

31. The apparatus of claim 29, wherein the error threshold is two errors or less.

32. The apparatus of claim 29, wherein code rate is about 0.99.

33. The apparatus of claim 29, wherein the apparatus is a stationary wireless device.

34. A system comprising:
a host system; and
a receiver communicatively coupled to the host system, the receiver to acquire a signal;
a forward error correction module to decode data from acquired signal if the data has a number of errors per frame equal to or less than an error threshold such that the data is not decoded, using forward error correction techniques, when the number of errors is greater than the error threshold; and
an integrity control to request retransmissions of the data adapted to use automatic repeat requests only if the number of errors is equal to or greater than a retransmission threshold, the retransmission threshold being at least 10 times greater than the error threshold, wherein the forward error correction module and the integrity control are adapted to operate above a physical layer of a communication network.

35. The system of claim 34, wherein the error threshold is two errors or less.

36. The system of claim 34, wherein the forward error correction module is adapted to operate in a data link layer of the communication network.

37. The system of claim 34, wherein the receiver is adapted to connect to a network interface card.

38. The system of claim 37, wherein the network interface card includes a 10 GBase-T device.

39. The system of claim 34, wherein the host system includes a processing system.

40. The system of claim 34, wherein the host system includes one or more of a computer, a switch, a router, or a server.

41. The system of claim 34, further including a bus to communicatively couple the host system to the receiver.

42. The system of claim 41, wherein the bus is compatible with PCI.

43. The system of claim 41, wherein the bus is compatible with PCI express.

44. A system comprising:
a forward error correction module in a data link layer to encode information providing a codeword with a code rate of 0.98 or higher;
a transmitter to transmit the codeword;
a host system communicatively coupled to the transmitter;
a receiver communicatively coupled to the host system, the receiver to acquire a signal;
a forward error correction module to decode data from an acquired signal if the data has a number of errors per frame equal to or less than an error threshold such that the data is not decoded, using forward error correction techniques, when the number of errors is greater than the error threshold; and
an integrity control to request retransmissions of the data adapted to use automatic repeat requests only if the number of errors is equal to or greater than a retransmission threshold, the retransmission threshold being at least 10 times greater than the error threshold, wherein the forward error correction module and the integrity control are adapted to operate above a physical layer of a communication network.

45. The system of claim 44, wherein the transmitter is adapted to connect to a network interface card.

46. The system of claim 45, wherein the network interface card includes a 10 GBase-T device.

47. The system of claim 44, wherein the host system includes one or more of a computer, a switch, a router, or a server.

48. The system of claim 44, further including a bus to communicatively couple the host system to the transmitter, wherein the bus is compatible with PCI.

49. The system of claim 44, further including a bus to communicatively couple the host system to the transmitter, wherein the bus is compatible with PCI express.

* * * * *